United States Patent
Yu et al.

(10) Patent No.: US 10,673,045 B2
(45) Date of Patent: Jun. 2, 2020

(54) SECONDARY BATTERY WITH IMPROVED LIFE CHARACTERISTICS

(71) Applicants: LG Chem, Ltd., Seoul (KR); TORAY INDUSTRIES, INC., Tokyo (JP)

(72) Inventors: Sung-Hoon Yu, Daejeon (KR); Jung-Don Suk, Daejeon (KR); Seok-Koo Kim, Daejeon (KR); Doo-Kyung Yang, Daejeon (KR); Yoo-Sun Kang, Daejeon (KR); Kyung-Mi Lee, Daejeon (KR); Jin-Hyun Park, Daejeon (KR)

(73) Assignees: LG Chem, Ltd. (KR); TORAY INDUSTRIES, INC. (JP)

( * ) Notice: Subject to any disclaimer, the term of this patent is extended or adjusted under 35 U.S.C. 154(b) by 146 days.

(21) Appl. No.: 15/851,068

(22) Filed: Dec. 21, 2017

(65) Prior Publication Data

US 2018/0123107 A1 May 3, 2018

Related U.S. Application Data

(63) Continuation of application No. 14/646,598, filed as application No. PCT/KR2014/009354 on Oct. 2, 2014, now Pat. No. 9,887,407.

(30) Foreign Application Priority Data

Apr. 4, 2014 (KR) .................. 10-2014-0040650

(51) Int. Cl.
*H01M 2/16* (2006.01)
*H01M 4/505* (2010.01)
(Continued)

(52) U.S. Cl.
CPC ......... *H01M 2/1686* (2013.01); *H01M 2/162* (2013.01); *H01M 2/166* (2013.01);
(Continued)

(58) Field of Classification Search
None
See application file for complete search history.

(56) References Cited

U.S. PATENT DOCUMENTS

2009/0136848 A1  5/2009  Minami et al.
2012/0028103 A1  2/2012  Weber et al.
(Continued)

FOREIGN PATENT DOCUMENTS

EP    2405510 A2    1/2012
EP    2466678 A2    6/2012
(Continued)

OTHER PUBLICATIONS

International Search Report for Application No. PCT/KR2014/009354 dated Jan. 27, 2015.
(Continued)

*Primary Examiner* — Daniel S Gatewood
(74) *Attorney, Agent, or Firm* — Lerner, David, Littenberg, Krumholz & Mentlik, LLP (57) ABSTRACT

The present disclosure refers to a secondary battery which comprises a high-voltage cathode active material and a separator whose pores are not obstructed even though being used together with the high-voltage cathode active material, thereby preventing the obstruction of pores in the separator and the formation of a dendrite in the anode and eventually providing good battery life performance.

16 Claims, 2 Drawing Sheets

(51) Int. Cl.
  *H01M 4/525* (2010.01)
  *H01M 10/0525* (2010.01)
  *H01M 4/131* (2010.01)

(52) U.S. Cl.
  CPC ........... *H01M 4/505* (2013.01); *H01M 4/525* (2013.01); *H01M 10/0525* (2013.01); *H01M 4/131* (2013.01)

(56) References Cited

U.S. PATENT DOCUMENTS

| | | |
|---|---|---|
| 2012/0077113 A1 | 3/2012 | Kim et al. |
| 2012/0196191 A1 | 8/2012 | Jeon et al. |
| 2013/0101886 A1 | 4/2013 | Jung et al. |
| 2013/0224571 A1* | 8/2013 | Sasaki ............... H01M 4/505 429/163 |
| 2014/0101931 A1 | 4/2014 | Lee et al. |
| 2014/0302389 A1 | 10/2014 | Hasegawa et al. |
| 2014/0349192 A1 | 11/2014 | Park et al. |
| 2015/0017515 A1 | 1/2015 | Jeon et al. |
| 2015/0050541 A1 | 2/2015 | Kinoshita et al. |

FOREIGN PATENT DOCUMENTS

| | | |
|---|---|---|
| EP | 2506339 A2 | 10/2012 |
| EP | 2648267 A2 | 10/2013 |
| JP | 2007280911 A | 10/2007 |
| JP | 2009123465 A | 6/2009 |
| JP | 2009218112 A | 9/2009 |
| JP | 2011238427 A | 11/2011 |
| JP | 2013506259 A | 2/2013 |
| KR | 20090088636 A | 8/2009 |
| KR | 20100135369 A | 12/2010 |
| KR | 20110075631 A | 7/2011 |
| KR | 20120114143 A | 10/2012 |
| KR | 20130043485 A | 4/2013 |
| KR | 20130117347 A | 10/2013 |
| TW | 201338247 A | 9/2013 |
| TW | 201351751 A | 12/2013 |
| TW | 201405913 A | 2/2014 |
| WO | 2013094004 A1 | 6/2013 |

OTHER PUBLICATIONS

Supplementary European Search Report for Application No. EP14888476 dated Apr. 12, 2017.

* cited by examiner

SECONDARY BATTERY WITH IMPROVED LIFE CHARACTERISTICS

CROSS REFERENCE TO RELATED APPLICATIONS

The present application is a continuation of U.S. patent application Ser. No. 14/646,598, filed on May 21, 2015, which is a national phase entry under 35 U.S.C. § 371 of International Application No. PCT/KR2014/009354, filed Oct. 2, 2014, which claims priority from Korean Patent Application No. 10-2014-0040650, filed Apr. 4, 2014; the disclosures of which are incorporated herein by reference.

TECHNICAL FIELD

This application claims priority to Korean Patent Application No. 10-2014-0040650 filed in the Republic of Korea on Apr. 4, 2014, the disclosures of which are incorporated herein by reference.

The present disclosure relates to a secondary battery with improved life characteristics, more specifically a secondary battery having a cathode active material for high voltage secondary battery ('high-voltage cathode active material') and a separator whose pores are not obstructed by the use of such a high-voltage cathode active material, thereby exhibiting improved life characteristics.

BACKGROUND ART

Secondary batteries require their miniaturization and weight-lightening so as to meet the miniaturization and high performances of various devices using the batteries. Further, the a stability, high rate characteristics and good cycle characteristics of the secondary batteries at a high temperature and a high voltage become important in order to be used in electric vehicles. Therefore, various cathode active materials have been studied in order to embody a high-voltage secondary batteries for a such use.

One of cathode active materials is $LiCoO_2$ being commercially available but it has disadvantages in terms of high price and an actual electrical capacity of 140 to 150 mAh/g that is merely 50% of its theoretical capacity. Accordingly, many researches have been actively made to provide another cathode active material for replacing $LiCoO_2$.

Also, $Li_2MoO_3$ having a layered-structure or $LiM_xMn_{2-x}O_4$ (0<x<2, M is Ni and the like) having a spinel structure has the advantage of high capacity as a cathode active material. However, a lithium salt or an organic solvent in an electrolyte solution decomposes during charging and discharging processes at a high potential (4.9 V) and a high temperature and manganese or molybdenum is released by HF which is produced by a reaction of the lithium salt and moisture. Particularly, these materials may deteriorate charging and discharging characteristics under the condition of a high temperature.

Meanwhile, currently available secondary batteries comprise separator so as to prevent a short circuit between a cathode and an anode and a porous layer made of polyolefin-based resins has been widely used. However, because the polyolefin-based resin has a melting point of 200° C. or less, it is apt to shrink at a high temperature when it was subject to a stretch process for the adjust of pore size or porosity thereof. As a result, when the temperature of a battery rises by internal and/or external factors, the separator may easily shrink or melt, thereby causing a short circuit between a cathode and an anode and resulting in accidents such as battery explosion by the emission of electric energy.

As a separator has a thinner thickness, the discharge capacity of an electrode can have a much more discharge capacity. It is considered because the concentration of a liquid electrolyte around the separator is high and the movement of substances can be facilitated. However, in the case that a polyethylene-based separator is used together with a high-voltage cathode active material, metallic ions released from the cathode active material form a dendrite on an anode and obstruct the pores of the separator, thereby bringing about a rapid decrease in a cycle capacity of the secondary battery at a high temperature.

DISCLOSURE

Technical Problem

The present disclosure is designed to solve the above-mentioned problem that a cathode active material is released to obstruct pores of a separator when a high-voltage cathode active material is used.

Also, the present disclosure is to provide a secondary battery with excellent cycle capacity at a high temperature.

Technical Solution

In accordance with one aspect of the present disclosure, there is provided an electrode assembly comprising a cathode, an anode, and a separator interposed between the cathode and the anode, wherein the cathode comprises a cathode active material capable of being applied at a high voltage, and the separator comprises a porous substrate and a porous coating layer formed on at least one surface of the porous substrate and comprising inorganic particles and an organic binder polymer, and has pores whose longest diameter ranges from 10 nm to 5 μm.

The cathode active material may be any one selected from lithium oxides of formula (I) to (IV) and a mixture thereof:

$$Li_x[Ni_aCo_bMn_c]O_2 \quad (I)$$

(0.95≤x≤1.05, 0≤a, b, c≤1, a+b+c=1, and a and c are not simultaneously 0)

$$Li[Li_xNi_aCo_bMn_c]O_2 \quad (II)$$

(0.05≤x≤0.6, and x+a+b+c=1)

$$Li_x[Ni_aCo_bMn_c]O_2 \quad (III)$$

(0.95≤x≤1.05, 0<a, b, c≤1, a+b+c=1, and 0.4<c<1)

$$LiMn_{2-x}M_xO_4 \quad (IV)$$

(M is at least one element selected from the group consisting of Ni, Co, Fe and Al, and 0≤x≤2)

The longest diameter of pores may range from 50 to 500 nm.

The separator may have a Gurley value of 1 to 3000 sec/100 cc.

The separator may have a Gurley value of 50 to 2000 sec/100 cc.

The porous coating layer may be formed in a thickness of 0.5 to 20 μm per one surface on at least one surface of the porous substrate.

The porous coating layer may be formed in a thickness of 3 to 6 μm per one surface on at least one surface of the porous substrate.

The porous coating layer may be formed on one surface of the porous substrate and disposed to be faced with the anode when interposed between the cathode and the anode.

The porous substrate may be a porous membrane obtained from a polyethylene resin.

The porous substrate may be a non-woven fabric.

In accordance with another aspect, there is provided a secondary battery comprising the above-mentioned electrode assembly.

The secondary battery may have an upper voltage of 4.3 to 5.0 V.

Advantageous Effects

According to one embodiment of the present disclosure, a separator having a porous coating layer formed on a porous substrate which may be a non-woven fabric with large pores, can be used together with a high-voltage cathode active material in a high-voltage secondary battery to provide improved life characteristics without a rapid decrease in cycle capacity at a high temperature.

Also, when a porous coating layer is formed on one surface of a polyolefin-based porous membrane and the porous coating layer is disposed to be faced with an anode to form an electrode assembly, it allows good movement of a cathode active material through the separator, and prevents the obstruction of pores in the separator and the formation of a dendrite in the anode, thereby inhibiting a rapid decrease in cycle capacity at a high temperature.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

BEST MODE

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The present disclosure provides a composite separator having a porous coating layer that allows good movement of a cathode active material. In the composite separator of the present disclosure, the porous coating layer comprising a binder polymer and inorganic particles having the ability to transport lithium ions is formed on at least one surface of a porous substrate. The composite separator has a higher impregnation rate with an electrolyte solution due to micropores present in the porous substrate and has a higher lithium-ion conductivity due to the ability of the inorganic particles to transport lithium ions.

The porous substrate used in the present disclosure may be in the form of a non-woven fabric where a porous web structure is formed by the crossing of nanofibers, or may be in the form of a porous membrane comprising a plurality of pores. Non-limiting examples of the porous substrate may include high-density polyethylene, linear low-density polyethylene, low-density polyethylene, ultra-high molecular weight polyethylene, polypropylene terephthalate, polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalate and a mixture thereof. The non-woven fabric is preferred since it has a plurality of large pores its inside, thereby improving impregnation with an electrolyte solution.

The porous substrate is not particularly limited to its thickness, but has preferably a thickness of 1 to 100 μm, more preferably 5 to 50 μm. If the thickness of the porous substrate is less than 1 μm, it is difficult to obtain the desired effect. If the thickness of the porous substrate is higher than 100 μm, the porous substrate may act as a resistance layer.

The porous coating layer formed by applying a slurry containing an organic binder polymer and inorganic particles in a solvent on the porous substrate, followed by drying may have a thickness of 0.5 to 20 μm, preferably 3 to 6 μm per one surface of the porous substrate. If the thickness of the porous coating layer is less than 0.5 μm, it is difficult to obtain the desired effect such as pore obtainment. If the thickness is higher than 20 μm, the porous coating layer may act as a resistance layer.

The inorganic particles used in the porous coating layer are not particularly limited if they are electrochemically stable. That is, the inorganic particles which may be used in the present disclosure are not particularly limited unless an oxidation-reduction reaction occurs in an operating voltage range (for example, 0 to 5 V based on Li/Li$^+$) of an applied electrochemical device. Particularly, inorganic particles having the ability to transport ions may be used to increase an ionic conductivity in electrochemical devices, thereby enhancing the performances thereof. Also, inorganic particles having a high dielectric constant may be used to increase a dissociation rate of an electrolyte salt, e.g., a lithium salt, in a liquid electrolyte, thereby improving an ionic conductivity of the electrolyte. For the above-mentioned reasons, the inorganic particles preferably include inorganic particles having a dielectric constant of 5 or higher, preferably 10 or higher, inorganic particles having the ability to transport lithium ions, or a mixture thereof.

Non-limiting examples of the inorganic particles having a dielectric constant of 5 or higher include $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC inorganic particles and a mixture thereof. Among these, inorganic particles such as $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT), hafnia ($HfO_2$) have high dielectric characteristic from a dielectric constant of 100 or more, and have piezoelectricity which can generate a charge when tensioned or compressed by the application of a certain pressure and then a potential difference between both surfaces. Therefore, a short circuit due to external impact in both electrodes can be prevented, thereby the safety of electrochemical devices being improved. Also, when the above-mentioned inorganic particles having a high dielectric constant and inorganic particles having the ability to transport lithium ions are mixed with each other, their synergistic effects may increase.

In the present disclosure, the inorganic particles having the ability to transport lithium ions, i.e., lithium-containing inorganic particles which can transfer lithium ions without holding them, are capable of transporting and transferring lithium ions due to a kind of defect present within a particle structure, thereby improving the conductivity of lithium ions in a battery and ultimately enhancing the performances of the battery. Non-limiting examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$) such as $14Li_2O\text{-}9Al_2O_3\text{-}38TiO_2\text{-}39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4\text{—}Li_2S\text{—}SiS_2$, $P_2S_5$ type glass ($Li_xP_yS_z$, $0<x<3$, $0<y<3$, $0<z<7$) such as $LiI\text{—}Li_2S\text{—}P_2S_5$, and a mixture thereof.

In the separator according to one embodiment of the present disclosure, the inorganic particles are not particularly limited to their size, but preferably have a size of 0.01 to 10 μm. If the size is smaller than 0.01 μm, the dispersibility becomes poor, making it difficult to control the structure and properties of the porous coating layer. If the size is larger than 10 μm, the thickness of the porous coating layer increases compared to that formed from the same solid content, which results in reduction in mechanic properties and causes an increase in possibility of an internal circuit during the charge/discharge of a battery due to the excessive large pore size.

The organic binder polymer used to form the porous coating layer may be any one which is conventionally used in the formation of a porous coating layer together with inorganic particles, preferably one having a solubility parameter of 15 to 45 $MPa^{1/2}$. The organic binder polymer plays a role of connecting and immobilizing inorganic particles therebetween. Non-limiting examples of the organic binder polymer may include polyvinylidene fluoride-co-hexafluoropropylene, polyvinylidene fluoride-co-trichloroethylene, polymethyl methacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile-styrene-butadiene copolymer and polyimide, which may be used alone or in a mixture.

The inorganic particles having the ability to transport lithium ions are present in an amount of 50 to 99 wt %, preferably 60 to 95 wt %, based on 100 wt % of the total amount of the inorganic particles and the organic binder polymer composing the porous coating layer. If the amount of the inorganic particles is less than 50 wt %, the amount of the organic binder polymer is so excessively much that the vacant space formed between the inorganic particles can be reduced, the pore size and porosity can be decreased and eventually the performances of a battery finally prepared can be deteriorated. If the amount of the inorganic particles is higher than 99 wt %, the amount of the organic binder polymer becomes too small, making the adhesion between the inorganic particles poor and deteriorating the mechanical properties of a battery finally prepared.

It is preferred that the solvent used to obtain a slurry for forming the porous coating layer has a solubility parameter similar to that of the binder polymer to be used and a low boiling point, so as to achieve uniform mixture and easy removal of the solvent afterward. Non-limiting examples of the solvent which may be used in the present invention include acetone, tetrahydrofuran, methylene chloride, chloroform, dimethylformamide, N-methyl-2-pyrrolidone (NMP), cyclohexane, water and a mixture thereof.

In the porous coating layer formed in the composite separator, interstitial volumes in micrometer unit are formed and the pore size and the porosity can be controlled by adjusting the size and the amount of the used inorganic particles and the composition of the used inorganic particles and the used organic binder polymer. As used herein, it is understood that the term "interstitial volumes" refers to vacant spaces defined by the substantially surface-contacted inorganic particles in a closed packed or densely packed structure which is formed by the inorganic particles in the porous coating layer being bonded with each other by the binder polymer, which forms pores.

According to one embodiment of the present disclosure, the porous coating layer may be formed on only one surface of the porous substrate to be faced with an anode when interposed between the cathode and the anode. When such a configuration of an electrode assembly is used in a secondary battery, it does not cause a rapid decrease in cycle capacity of the secondary battery at high-temperature even though a high-voltage cathode active material is used. Such rapid decrease occurs because metal ions released from the high-voltage cathode active material are deposited on the anode. However, in the electrode assembly according to one embodiment of the present disclosure, the metal ions pre-fill the pores of the porous coating layer, thereby increasing the pore size and porosity of the separator on the whole and retarding the pore obstruction resulted from the formation of a lithium dendrite. As a result, life performances can be dramatically improved.

As used herein, the term "high-voltage cathode active material" refers to a compound that can be applied at a high voltage ranging from 4.3 to 5.0 V and can reversibly intercalate/disintercalate lithium ions. The voltage of 4.3 to 5.0 V may be the upper limit for the cathode active material.

The pores present in the composite separator, more specifically, the pores formed on the porous coating layer of the composite separator has a longest diameter ranges from 10 nm to 5 μm, preferably 50 nm to 1 μm, more preferably 50 nm to 500 nm. If the pore size is smaller than 10 nm, it is difficult to obtain the effect of the porous coating layer since the pore size is similar to that of the conventional separator substrate such as polyethylene and polypropylene. If the pore size is larger than 5 μm, the mechanical strength of the separator may be severely lowered. Also, the above-mentioned pore size range is determined by considering the following matters: although interstitial volumes when alumina with about 400 nm diameter assumed as a sphere is used are generally assumed as ideal pores, the actual pores substantially have an inverse opal structure whose pore size is larger than the radius of inorganic particles such as alumina and smaller than the diameter thereof; and these particles are not ideally packed due to the influence of the binder.

Such a composite separator of the present disclosure preferably has a Gurley value of 1 to 3000 sec/100 cc, more preferably 50 to 2000 sec/100 cc. As used herein, the term "Gurley value" is also called "air permeability" and refers to the time in seconds required for 100 cc of air to pass through a certain area.

The separator thus prepared is interposed between a cathode and an anode and is used in a secondary battery. In particular, among the secondary batteries, lithium secondary batteries including a lithium metal secondary battery, a lithium ion secondary battery, a lithium polymer secondary battery or a lithium ion polymer secondary battery are preferred.

The secondary battery may be prepared according to a conventional method known in the art, for example, by interposing the separator between a cathode and an anode to obtain an electrode assembly and introducing an electrolyte solution.

The electrodes to be applied together with the separator may be prepared by binding an electrode active material to an electrode current collector according to a conventional method known in the art.

The cathode active material which may be used in the present disclosure is not limited if it can be applied at a high voltage ranging from 4.3 to 5.0 V and can reversibly intercalate/disintercalate lithium ions. Non-limiting examples of the cathode active material may include a spinel-structured lithium manganese oxide wherein the site of Mn is partially substituted with at least one of aluminum, magnesium, lithium, cobalt and nickel, or a lithium manganese oxide of formula $LiMn_{2-x}M_xO_4$ (M is at least one of Al, Mg, Li, Co and Ni, and $0 \leq x \leq 0.1$). Preferably, the cathode active material may be any one selected from lithium oxides of formula (I) to (IV) and a mixture thereof:

$$Li_x[Ni_aCo_bMn_c]O_2 \quad (I)$$

($0.95 \leq x \leq 1.05$, $0 \leq a, b, c \leq 1$, $a+b+c=1$, and a and c are not simultaneously 0)

$$Li[Li_xNi_aCo_bMn_c]O_2 \quad (II)$$

($0.05 \leq x \leq 0.6$, and $x+a+b+c=1$)

$$Li_x[Ni_aCo_bMn_c]O_2 \quad (III)$$

($0.95 \leq x \leq 1.05$, $0 < a, b, c \leq 1$, $a+b+c=1$, and $0.4 < c < 1$)

$$LiMn_{2-x}M_xO_4 \quad (IV)$$

(M is at least one element selected from the group consisting of Ni, Co, Fe and Al, and $0 \leq x \leq 2$)

The cathode active material preferably has an average diameter of 5 to 15 μm. If the average diameter is smaller than 5 μm, the tap density of the active material may be lowered. If the average diameter is longer than 15 μm, the particles of the active material are difficult to be uniformly dispersed, thereby lowering the tap density, and the diffusion length of lithium ions becomes long due to the excessive large particle size, thereby deteriorating electrochemical characteristics.

The anode active material may be any one which has been conventionally used in the anode of conventional secondary batteries. Non-limiting examples of the anode active material may include lithium metal, lithium alloys, and lithium intercalation materials such as carbon, petroleum coke, activated carbon, graphite and other carbonaceous materials. Non-limiting examples of a cathode current collector may include aluminum foils, nickel foils and a combination thereof. Non-limiting examples of an anode current collector may include copper foils, gold foils, nickel foils, copper alloy foils and a combination thereof.

The electrolyte solution used in the present disclosure comprises a salt and an organic solvent capable of dissolving or dissociating the salt. The salt has a structure represented by $A^+B^-$ wherein $A^+$ is an alkali metal cation such as $Li^+$, $Na^+$, $K^+$ and a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and a combination thereof. Examples of organic solvents may include, but are not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone and a mixture thereof.

The electrolyte solution may be injected in any suitable step during the manufacturing of the battery depending on the manufacturing processes and desired physical properties of a final product. Specifically, the electrolyte may be injected before battery assembly or in the final step of battery assembly.

The battery of the present disclosure is generally prepared by winding the separator and the electrodes. Lamination (or stacking) and folding of the separator and the electrodes are also possible.

Hereinafter, preferred examples of the present disclosure will be described in detail for better understanding. However, the examples of the present disclosure may be modified in various ways, and they should not be interpreted as limiting the scope of the invention. The examples of the present disclosure are just for better understanding of the invention to persons having ordinary skill in the art.

Example 1-1: Preparation of Separator 5 wt % of polyvinylidene fluoride-co-hexafluoropropylene (PVdF-HFP) was added and dissolved in acetone at 50° C. for about 12 hours or more to obtain a binder polymer solution. Powders of $Al_2O_3$ were added to the binder polymer solution so that the weight ratio of binder polymer/$Al_2O_3$ is 10/90, and were subject to pulverization and dispersion by way of ball milling for 12 hours or more, to obtain a slurry for forming a porous coating layer. The diameter of $Al_2O_3$ in the slurry thus obtained was about 400 nm. The slurry was coated in a thickness of about 5 μm on one surface of a polyethylene resin (SK512GK, SKI, 12 μm thickness, 40% porosity) as a porous substrate by way of dip coating, to prepare a separator having a pore size of about 50 nm to 1 μm.

Example 1-2: Preparation of Secondary Battery (Preparation of Cathode)

94 wt % of $Li[Li_{0.29}Ni_{0.14}Co_{0.11}Mn_{0.46}]O_2$ as a cathode active material, 3 wt % of carbon black as a conductive material, and 3 wt % of PVdF as a binder were added to N-methyl-2-pyrrolidone (NMP) as a solvent to obtain a slurry containing a mixture of cathode materials. The slurry was coated on an Al-thin film having a thickness of about 20 μm as a cathode current collector, followed by drying, to obtain a cathode.

(Preparation of Anode)

96 wt % of Carbon powder as an anode active material, 3 wt % of PVdF as a binder, and 1 wt % of carbon black as a conductive material were added to NMP as a solvent to obtain a slurry containing a mixture of anode materials. The slurry was coated on a Cu-thin film having a thickness of 10 µm as an anode current collector, followed by drying, to obtain a cathode. ☐

(Preparation of Battery)

The separator prepared in Example 1-1 was interposed between the cathode and the anode obtained above so that the porous coating layer was faced with the anode, followed by stacking, to obtain an electrode assembly, to which an electrolyte solution of 1M lithium hexafluorophosphate (LiPF$_6$) dissolved in a solvent mixture of ethylene carbonate/propylene carbonate/diethyl carbonate (EC/PC/DEC=30:20:50, wt %) was introduced, thereby preparing a secondary battery.

Example 2-1: Preparation of Separator

The procedures of Example 1-1 were repeated except that a resin of polypropylene/polyethylene/polypropylene (C210, Celgard, 16-µm thickness) was used as a porous substrate and the porous coating layer was formed in each thickness of 3 µm (total 6 µm) on both surfaces of the porous substrate, to prepare a separator.

Example 2-2: Preparation of Secondary Battery

The procedures of Example 1-2 were repeated except that the separator prepared in Example 2-1 was used to prepare a secondary battery.

Example 3-1: Preparation of Separator

The procedures of Example 2-1 were repeated except that the porous coating layer was formed in each thickness of 5 µm (total 10 µm) on both surfaces of the porous substrate, to prepare a separator.

Example 3-2: Preparation of Secondary Battery

The procedures of Example 1-2 were repeated except that the separator prepared in Example 3-1 was used to prepare a secondary battery.

Example 4-1: Preparation of Separator

The procedures of Example 2-1 were repeated except that the porous coating layer was formed in each thickness of 6 µm (total 12 µm) on both surfaces of the porous substrate, to prepare a separator.

Example 4-2: Preparation of Secondary Battery

The procedures of Example 1-2 were repeated except that the separator prepared in Example 4-1 was used to prepare a secondary battery.

Example 5-1: Preparation of Separator

The procedures of Example 2-1 were repeated except that a polypropylene resin (PP1615, Celgard, 16 µm thickness) was used as a porous substrate and the porous coating layer was formed in each thickness of 5 µm (total 10 µm) on both surfaces of the porous substrate, to prepare a separator.

Example 5-2: Preparation of Secondary Battery

The procedures of Example 1-2 were repeated except that the separator prepared in Example 5-1 was used to prepare a secondary battery.

Example 6-1: Preparation of Separator

The procedures of Example 2-1 were repeated except that a polyethylene terephthalate (PET) non-woven fabric (15-µm thickness) was used as a porous substrate and the porous coating layer was formed in each thickness of 5 µm (total 10 µm) on both surfaces of the porous substrate, to prepare a separator.

Example 6-2: Preparation of Secondary Battery

The procedures of Example 1-2 were repeated except that the separator prepared in Example 6-1 was used to prepare a secondary battery.

Comparative Example 1-1: Preparation of Separator

A polyethylene resin (SK512GK, SKI, 12 µm thickness, Gurley value 160 sec) being a porous substrate was used as a separator.

Comparative Example 1-2: Preparation of Secondary Battery

The procedures of Example 1-2 were repeated except that the separator of Comparative Example 1-1 was used to prepare a secondary battery.

Comparative Example 2-1: Preparation of Separator

The separator prepared in Example 1-1 was used.

Comparative Example 2-2: Preparation of Secondary Battery

The procedures of Example 2-2 were repeated except that the separator of Comparative Example 2-1 was interposed between the cathode and the anode so that the porous coating layer of the separator is faced with the cathode.

Comparative Example 3-1: Preparation of Separator

A resin of polypropylene/polyethylene/polypropylene (C210, Celgard, 16 µm thickness) being a porous substrate was used as a separator.

Comparative Example 3-2: Preparation of Secondary Battery

The procedures of Example 1-2 were repeated except that the separator of Comparative Example 3-1 was used to prepare a secondary battery.

Comparative Example 4-1: Preparation of Separator

A polypropylene resin (PP1615, Celgard, 16 µm thickness) being a porous substrate was used as a separator.

Comparative Example 4-2: Preparation of Secondary Battery

The procedures of Example 1-2 were repeated except that the separator of Comparative Example 4-1 was used to prepare a secondary battery.

Test Examples

Evaluation of Separator for Gurley Value

The separators prepared in Examples 1-1 to 6-1 and Comparative Examples 1-1 to 4-1 were cut into a piece of 50 mm×50 mm to prepare samples. Each of the samples was measured for the time (seconds) required for 100 ml of air to pass. The results thereof are shown in Table 1.

TABLE 1

| Separator | Gurley value (sec/100 mL) |
|---|---|
| Example 1-1 | 244 |
| Example 2-1 | 1000 |
| Example 3-1 | 1350 |
| Example 4-1 | 1450 |
| Example 5-1 | 857 |
| Example 6-1 | 70 |
| Comparative Example 1-1 | 160 |
| Comparative Example 2-1 | 244 |
| Comparative Example 3-1 | 464 |
| Comparative Example 4-1 | 400 |

From the test results, it was confirmed that the separator of Example 6-1 having porous coating layers on both surfaces of a polyethylene terephthalate non-woven fabric exhibited the most excellent air permeability; the separator of Comparative Example 1-1 having no porous coating layer on a porous substrate showed the excellent air permeability; and, the separators of Example 1-1 and Comparative Example 2-1 having a porous coating layer on only one surface of a polyethylene porous membrane exhibited the next good values of air permeability in order.

Evaluation for Cycle Capacity at a High Temperature

The batteries prepared in the Examples and Comparative Examples were subject to 1C charge/1C discharge at a voltage range of 4.35 to 2.5 V at 45° C. until 40 cycles or 80 cycles, and the results thereof are shown in FIGS. 1 to 4.

Figure 1:
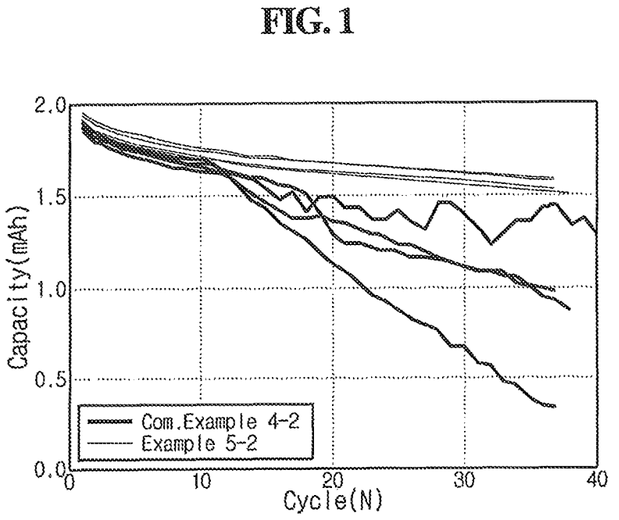
FIG. 1 is a graph showing a high-temperature life performance of secondary batteries prepared in Comparative Example 4-2 and Example 5-2.
Figure 2:
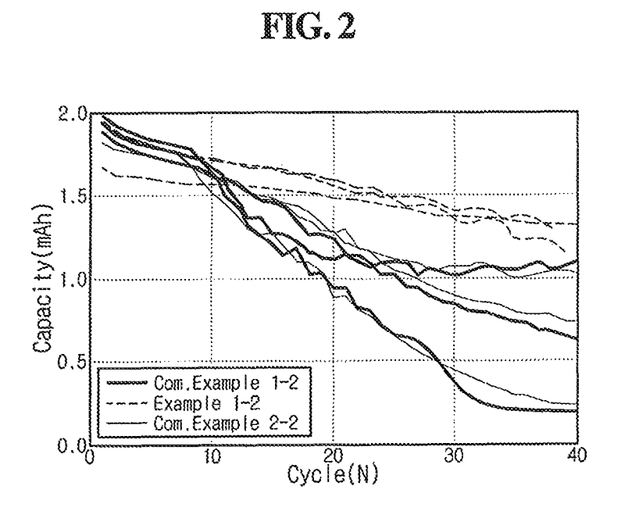
FIG. 2 is a graph showing a high-temperature life performance of secondary batteries prepared in Comparative Examples 1-2 and 2-2, and Example 1-2.
Figure 3:
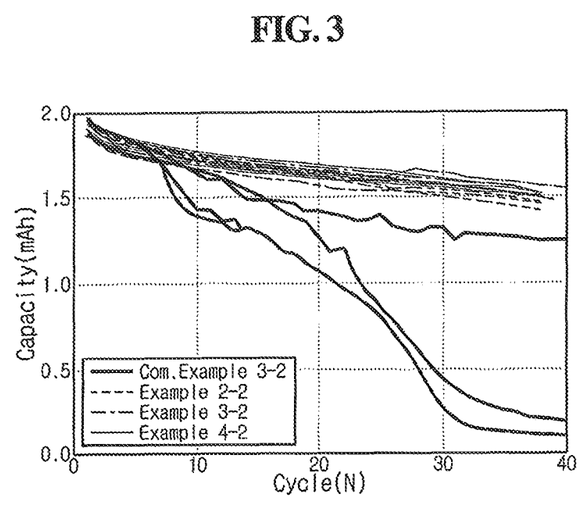
FIG. 3 is a graph showing a high-temperature life performance of secondary batteries prepared in Comparative Example 2-2 and Examples 2-2 to 4-2.

The separators of Example 1-1 and Comparative Example 2-1 which each have a porous coating layer in the same thickness on only one surface of a porous substrate exhibited the same result in terms of Gurley value. Meanwhile, in the batteries of Example 1-2 and Comparative Example 2-2 where the application direction of the coating layer is changed, Example 1-2 applying the porous coating layer to be faced with the anode provided superior cycle life, as compared with Comparative Example 2-2 applying the porous coating layer to be faced with the cathode (FIG. 2).

Figure 4:
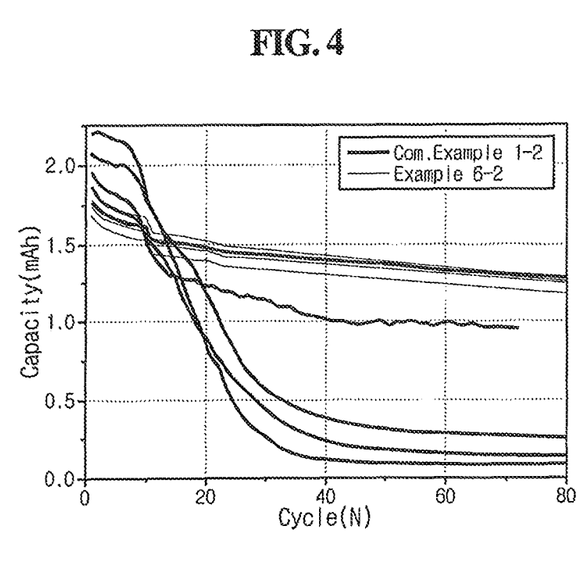
FIG. 4 is a graph showing a high-temperature life performance of secondary batteries prepared in Comparative Example 1-2 and Example 6-2.

Also, it was confirmed from FIG. 4 that the secondary battery of Example 6-2 applying porous coating layers on both surface of a non-woven fabric provided superior cycle life, as compared with that of Comparative Example 1-2 applying no porous coating layer.

What is claimed is:

1. An electrode assembly, comprising:
   a cathode;
   an anode; and
   a separator interposed between the cathode and the anode,
   wherein the cathode comprises a cathode active material capable of being applied at a high voltage and represented by any one selected from the group consisting of following formulae (I) to (III), and mixtures thereof, and
   wherein the separator comprises a porous substrate and a porous coating layer formed on only one surface of the porous substrate and comprising inorganic particles and an organic binder polymer, and has pores whose longest diameter ranges from 50 nm to 1 μm,
   wherein the inorganic particles are present in an amount of 50 to 99 wt % based on 100 wt % of the total amount of the inorganic particles and the organic binder polymer,
   wherein the porous coating layer is formed in a thickness of 0.5 to 20 μm, and
   wherein the porous coating layer is disposed to be faced with the anode, $Li_x[Ni_aCo_bMn_c]O_2$  (I)

(0.95≤x≤1.05, 0≤a, b, c≤1, a+b+c=1, and a and c are not simultaneously 0), $Li[Li_xNi_aCo_bMn_c]O_2$  (II)

(0.05≤x≤0.6, and x+a+b+c=1), $Li_x[Ni_aCo_bMn_c]O_2$  (III)

(0.95≤x≤1.05, 0<a, b, c≤1, a+b+c=1, and 0.4<c<1).

2. An electrode assembly, comprising:
   a cathode;
   an anode;
   and a separator interposed between the cathode and the anode,
   wherein the cathode comprises a cathode active material capable of being applied at a high voltage and represented by any one selected from the group consisting of following formulae (I) to (III), and mixtures thereof, and
   wherein the separator comprises a porous substrate and a porous coating layer formed on only one surface of the porous substrate and comprising inorganic particles and an organic binder polymer, and has pores whose longest diameter ranges from 10 nm to 5 μm,
   wherein the inorganic particles are present in an amount of 50 to 99 wt % based on 100 wt % of the total amount of the inorganic particles and the organic binder polymer,
   wherein the porous coating layer is formed in a thickness of 0.5 to 20 μm, and
   wherein the porous coating layer is disposed to be faced with the anode,
   wherein the inorganic particles have a size of 0.01 to 10 μm, $Li_x[Ni_aCo_bMn_c]O_2$  (I)

(0.95≤x≤1.05, 0≤a, b, c≤1, a+b+c=1, and a and c are not simultaneously 0), $Li[Li_xNi_aCo_bMn_c]O_2$  (II)

(0.05≤x≤0.6, and x+a+b+c=1), $Li_x[Ni_aCo_bMn_c]O_2$  (III)

(0.95≤x≤1.05, 0<a, b, c≤1, a+b+c=1, and 0.4<c<1).

3. An electrode assembly, comprising:
   a cathode;
   an anode; and
   a separator interposed between the cathode and the anode,
   wherein the cathode comprises a cathode active material capable of being applied at a high voltage and represented by any one selected from the group consisting of following formulae (I) to (III), and mixtures thereof, and wherein the separator comprises a porous substrate and a porous coating layer formed on only one surface of the porous substrate and comprising inorganic particles and an organic binder polymer, and has pores whose longest diameter ranges from 10 nm to 5 μm, wherein the inorganic particles are present in an amount of 50 to 99 wt % based on 100 wt % of the total amount of the inorganic particles and the organic binder polymer, wherein the porous coating layer is formed in a thickness of 0.5 to 20 μm, and wherein the porous coating layer is disposed to be faced with the anode, wherein the porous substrate is a porous membrane obtained from a polyethylene resin, a polypropylene/polyethylene/polypropylene resin, or a polypropylene resin, $$Li_x[Ni_aCo_bMn_c]O_2 \quad (I)$$

$(0.95 \leq x \leq 1.05, 0 \leq a, b, c \leq 1, a+b+c=1,$ and a and c are not simultaneously 0), $$Li[Li_xNi_aCo_bMn_c]O_2 \quad (II)$$

$(0.05 \leq x \leq 0.6,$ and $x+a+b+c=1)$, $$Li_x[Ni_aCo_bMn_c]O_2 \quad (III)$$

$(0.95 \leq x \leq 1.05, 0 < a, b, c \leq 1, a+b+c=1,$ and $0.4 < c < 1)$.

4. The electrode assembly of claim 1, wherein the cathode active material has an average diameter of 5 to 15 μm.

5. The electrode assembly of claim 1, wherein the longest diameter of pores ranges from 50 to 500 nm.

6. The electrode assembly of claim 1, wherein the porous coating layer is formed in a thickness of 3 to 6 μm.

7. The electrode assembly of claim 1, wherein the inorganic particles have a dielectric constant of 5 or higher.

8. The electrode assembly of claim 1, wherein the inorganic particles are selected from the group consisting of $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, SiC inorganic particles and a mixture thereof.

9. The electrode assembly of claim 1, wherein the inorganic particles have a size of 0.01 to 10 μm.

10. The electrode assembly of claim 1, wherein the organic binder polymer is selected from the group consisting of polyvinylidene fluoride-co-hexafluoropropylene, polyvinylidene fluoride-co-trichloroethylene, polymethyl methacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile-styrene-butadiene copolymer, polyimide, and a mixture thereof.

11. The electrode assembly of claim 1, wherein the porous substrate is a porous membrane obtained from a polyethylene resin, a polypropylene/polyethylene/polypropylene resin, or a polypropylene resin.

12. The electrode assembly of claim 1, wherein the porous substrate is a non-woven fabric.

13. The electrode assembly of claim 2, wherein the inorganic particles have a dielectric constant of 5 or higher.

14. The electrode assembly of claim 2, wherein the porous coating layer is formed in a thickness of 3 to 6 μm.

15. The electrode assembly of claim 3, wherein the inorganic particles have a dielectric constant of 5 or higher.

16. The electrode assembly of claim 3, wherein the porous coating layer is formed in a thickness of 3 to 6 μm.

* * * * *